US011119008B2

(12) United States Patent
Cantu' et al.

(10) Patent No.: US 11,119,008 B2
(45) Date of Patent: Sep. 14, 2021

(54) METHOD FOR CHECKING TIRES

(71) Applicant: PIRELLI TYRE S.P.A., Milan (IT)

(72) Inventors: Marco Cantu', Milan (IT); Fabio Regoli, Bologna (IT); Vincenzo Boffa, Milan (IT); Luca Tersi, Grigliasco (IT)

(73) Assignee: PIRELLI TYRE S.P.A., Milan (IT)

( * ) Notice: Subject to any disclaimer, the term of this patent is extended or adjusted under 35 U.S.C. 154(b) by 71 days.

(21) Appl. No.: 16/614,024

(22) PCT Filed: Jun. 4, 2018

(86) PCT No.: PCT/IT2018/050097
§ 371 (c)(1),
(2) Date: Nov. 15, 2019

(87) PCT Pub. No.: WO2018/229805
PCT Pub. Date: Dec. 20, 2018

(65) Prior Publication Data
US 2020/0072704 A1 Mar. 5, 2020

(30) Foreign Application Priority Data
Jun. 12, 2017 (IT) .......................... 102017000064951

(51) Int. Cl.
*G01M 17/007* (2006.01)
*G01M 17/02* (2006.01)

(52) U.S. Cl.
CPC ................................ *G01M 17/027* (2013.01)

(58) Field of Classification Search
CPC .. G01M 17/007; G01M 17/02; G01M 17/022; G01M 17/024; G01M 17/025; G01M 17/027; G01M 17/028
See application file for complete search history.

(56) References Cited

U.S. PATENT DOCUMENTS 6,934,018 B2    8/2005  Shaw et al.
8,059,279 B2   11/2011  Iino et al.
(Continued)

FOREIGN PATENT DOCUMENTS

CN    101124454 A    2/2008
CN    101311669 A   11/2008
(Continued)

OTHER PUBLICATIONS

Russian Decision to Grant for RU Application No. 2018120333 filed on Dec. 14, 2016 on behalf of Pirelli Tyre S.P.A. dated May 28, 2020 17 pages (English + Original).
(Continued)

*Primary Examiner* — Eric S. McCall
(74) *Attorney, Agent, or Firm* — Steinfl + Bruno, LLP

(57) ABSTRACT

A method for checking tyres. A shift is determined along an acquisition direction between an acquisition point on a surface of a tyre to be checked and a position occupied by the acquisition point following a rotation of the tyre about its rotation axis. A linear laser beam is projected on a linear portion of surface of the tyre, and propagates in a direction parallel to the acquisition direction. A matrix image of a matrix portion of surface of the tyre containing the linear portion of surface is acquired; the image containing a laser line reflected by the linear portion of surface. A sub-portion of the matrix image is determined as a function of the determined shift, containing the reflected laser line. The sub-portion of the matrix image is then processed to determine an elevation profile of the linear portion of surface.

15 Claims, 3 Drawing Sheets

(56) References Cited

U.S. PATENT DOCUMENTS

| | | | |
|---|---|---|---|
| 2001/0024279 A1 | 9/2001 | Kaneko et al. | |
| 2005/0264796 A1 | 12/2005 | Shaw et al. | |
| 2006/0152711 A1 | 7/2006 | Dale et al. | |
| 2008/0297777 A1 | 12/2008 | Sotgiu | |
| 2009/0267784 A1 | 10/2009 | Braghiroli et al. | |
| 2010/0002244 A1 | 1/2010 | Iino et al. | |
| 2011/0221887 A1 | 9/2011 | Shuttleworth | |
| 2014/0086453 A1 | 3/2014 | Imada et al. | |
| 2014/0341460 A1 | 11/2014 | Ballabio et al. | |
| 2015/0075271 A1 | 3/2015 | Tracy et al. | |
| 2015/0226644 A1 | 8/2015 | Boffa et al. | |
| 2016/0320265 A1* | 11/2016 | Regoli | G05B 19/41875 |
| 2017/0350794 A1* | 12/2017 | Monti | G06T 7/001 |
| 2017/0370807 A1* | 12/2017 | Boffa | G01M 17/021 |
| 2018/0299353 A1* | 10/2018 | Held | B29D 30/0633 |
| 2018/0328819 A1* | 11/2018 | Boffa | G01M 17/027 |
| 2018/0364134 A1* | 12/2018 | Held | H04N 5/2256 |
| 2019/0017902 A1* | 1/2019 | Held | G01B 11/24 |
| 2019/0145862 A1* | 5/2019 | Boffa | G06T 7/0006 348/92 |
| 2019/0145906 A1* | 5/2019 | Boffa | G01M 17/027 348/131 |
| 2019/0283351 A1* | 9/2019 | Vaniglia | B29D 30/32 |
| 2020/0400590 A1* | 12/2020 | Boffa | H04N 13/156 |

FOREIGN PATENT DOCUMENTS

| | | |
|---|---|---|
| CN | 101566528 A | 10/2009 |
| CN | 102507589 A | 6/2012 |
| CN | 103534583 A | 1/2014 |
| CN | 104111176 A | 10/2014 |
| EP | 1120640 A1 | 8/2001 |
| EP | 2793013 A1 | 10/2014 |
| RU | 2527617 C1 | 9/2014 |
| RU | 2529562 C1 | 9/2014 |
| WO | 2015/044196 A1 | 4/2015 |
| WO | 2017/103809 A1 | 6/2017 |

OTHER PUBLICATIONS

Russian Search Report for RU Application No. 2018120333 filed on Dec. 14, 2016 on behalf of Pirelli Tyre S.P.A. dated May 18, 2020 4 pages (English + Original).

International Search Report and Written Opinion for International Application No. PCT/IB2016/057613 filed on Dec. 14, 2016 on behalf of Pirelli Tyre S.P.A. dated Mar. 14, 2017. 8 pages.

International Search Report and Written Opinion for International Application No. PCT/IT2018/050097 filed Dec. 20, 2018 on behalf of Pirelli Tyre S.P.A., dated Jul. 8, 2018. 10 pages.

First Office Action for Chinese Application 201680070473.6 on behalf of Pirelli Tyre S.P.A. dated Dec. 4, 2019. 12 pages.

First Chinese Office Action for Chinese Application No. 201880035212.X filed Jun. 4, 2018 on behalf of Pirelli Tyre S.P.A. dated Jun. 24, 2021. 14 pages (English + Original).

Prochazka D. et al., "Detection of tire tread particles using laser-induced breakdown spectroscopy" Spectrochimica Acta Part B, 108, (Mar. 2015) 1-7.

Xiao Y. et al., "Development and Application of Novel Nondestructive Detector for Laser Speckle Tire" Non-Destructive Detection, Feb. 2012, vol. 36, No. 1 (English + Original) 8 pages.

* cited by examiner

METHOD FOR CHECKING TIRES

CROSS-REFERENCE TO RELATED APPLICATIONS

The present application is the U.S. National Stage of International Patent Application No. PCT/IT2018/050097 filed on Jun. 4, 2018 which, in turn, claims priority to Italian Patent Application No. 102017000064951 filed on Jun. 12, 2017.

TECHNICAL FIELD OF THE INVENTION

The present invention relates to a method for checking tyres in a tyre production line, in particular by acquisition of images of the surface of a tyre and their subsequent processing, for example for checking the possible presence of detectable defects on the surface of a tyre.

STATE OF THE ART

By "tyre" it is typically meant the finished tyre, i.e. after the building, moulding and vulcanization steps, but also possibly the green tyre after the building step and before the moulding and/or vulcanization steps.

Typically, a tyre has a substantially toroidal structure about a rotation axis thereof during operation, and it has an axial middle plane perpendicular to the rotation axis, said plane being typically a plane of (substantial) geometric symmetry (e.g. neglecting any minor asymmetries, such as the tread pattern and/or the internal structure).

By 'radial plane' of a tyre it is meant any plane on which the rotation axis lies.

By 'profile on a plane' of a tyre it is meant the contour (or perimeter) of the result of the intersection (section) of the tyre with said plane.

By external or internal surface of the tyre, it is respectively meant the surface which remains visible after the coupling of the tyre with its own mounting rim and that which is no longer visible after said coupling.

By the terms "low", "high", "below" and "above" it is identified the relative position of an element, such as for example a component of a tyre, a tyre, an apparatus, a device, etc., with respect to the soil during use or the relative position of one of said elements with respect to another element.

By 'substantially perpendicular' relative to geometric elements (such as straight lines, planes, surfaces, etc.) it is meant that such elements form an angle of 90°+/−15°, preferably of 90°+/−10°.

By 'substantially parallel' with respect to the aforesaid geometrical elements it is meant that such elements form an angle of 0°+/−15°, preferably of 0°+/−10°.

The terms 'optical', light' and the like refer to an electromagnetic radiation in use which has at least a portion of the spectrum falling in a widened neighbourhood of the optical band, and not necessarily strictly falling within the optical band (i.e. 400-700 nm), for example, such widened neighbourhood of the optical band may range from ultraviolet to infrared (for example, wavelength of between about 100 nm and about 1 μm).

By "digital image", or equivalently "image", it is generally meant a set of data, typically contained in a computer file, in which each tuple of coordinates (typically each pair of coordinates) of a finite set (typically two-dimensional and matrix, i.e. N rows×M columns) of tuples of spatial coordinates (each tuple corresponding to a pixel) is associated with a corresponding set of numerical values (which may be representative of different magnitudes). For example, in monochrome images (such as those in grey levels or 'greyscale'), such a set of values consists of a single value in a finite scale (typically 256 levels or tones), this value for example being representative of the luminosity (or intensity) level of the respective tuple of spatial coordinates when displayed. A further example is represented by colour images, in which the set of values represents the luminosity level of a plurality of colours or channels, typically the primary colours (for example red, green and blue in RGB coding and cyan, magenta, yellow and black in CMYK coding). The term 'image' does not necessarily imply the actual display of the same.

Any reference to a specific "digital image" (for example, the digital image initially acquired on the tyre) includes more generally any digital image obtainable through one or more digital processing of said specific digital image (such as, for example, filtering, equalization, smoothing, binarization, thresholding, morphological transformations (opening, etc.), derivative or integral calculations, etc.).

The term "two-dimensional image" or "2D" means a digital image each pixel of which is associated to information representative of the reflectivity/diffusivity and/or colour of the surface, such as the images detected from the common cameras or digital cameras (e.g. CCD).

The term "three-dimensional image" or "3D" means a digital image each pixel of which is associated to surface height information, for example the images obtained by the altimetric profile reconstruction technique of a surface through a triangulation processing of a two-dimensional matrix image of the surface illuminated by a linear laser beam.

"Digital camera" or in short "camera" denotes an optoelectronic device adapted to acquire a two-dimensional digital image and including a digital image sensor (or in short 'sensor'), which defines an image plane, and an objective (which for simplicity is assumed having cylindrical symmetry, although the invention is not limited only to these objectives).

'Sensor' means a set of photosensitive elements (called 'pixels') capable of transforming the incident light into an electric signal, for example by CCD or CMOS technology. The term pixel is used to denote both the single photosensitive element of the sensor, and the single element forming the digital image as defined above, each pixel of the sensor typically corresponding to a pixel of the image.

"Matrix camera" means a camera whose sensor has the pixels arranged according to a rectangular matrix having the two dimensions of comparable length (for example, the two dimensions differ by less than one order of magnitude, as in the 4×3 or 3×2 formats). Typically, the diagonal of the sensor matrix is long some tens of millimetres. By "matrix portion of surface" it is meant likewise a portion of surface having the two dimensions of comparable length.

"Linear camera" means a camera whose sensor (referred to as 'linear sensor') has the pixels arranged in a rectangular matrix having a dimension much greater than the other, typically greater by at least two orders of magnitude. Typically, the number of rows of pixels of the sensor is between 1 and 4 and the number of columns is greater than 1000. The terms 'rows' and 'columns' are conventionally used and are interchangeable. A linear camera is characterised by an objective line, lying on the intersection between the focal plane of the camera and the plane (referred to as 'optical plane') orthogonal thereto and passing through the linear sensor, and is adapted to acquire images of linear surface portions arranged at the objective line (referred to as 'linear images' and having dimensions in pixels equal to the dimensions of the linear sensor). "Surface linear portion" means likewise a surface portion having a dimension much greater than the other dimension orthogonal thereto, typically greater by at least two orders of magnitude. The minor dimension of the linear surface portion is typically less than or equal to 0.1 mm.

"Optic axis" of an objective denotes the line along which a rotation symmetry of the objective exists.

"Focusing plane" or "focal plane" of a camera means the plane of object points that are focused by the objective on the sensor, i.e. the rays originating from each object point of the focal plane converge in a respective point on the sensor plane (image plane).

'Depth of field' means the set of planes in a neighbourhood of the focal plane each point of which, when projected by the objective on the sensor plane, forms an image inscribed in a predetermined circle of confusion (for example having a diameter of 5-10 microns).

By "linear laser beam" it is meant a laser beam propagating in a propagation plane along a propagation direction, the laser beam having a cross section, perpendicular to the propagation line, in the form of line, typically shaped as a straight segment.

In the context of the production and building processes of tyres for vehicle wheels, it is particularly useful to perform automatic quality inspections on manufactured products, with the aim to prevent defective tyres, or tyres not meeting the design specifications, from being put on the market, and/or to progressively adjust the apparatuses and machinery used so as to improve and optimise the execution of the operations carried out in the production process.

US 2010/0002244 A1 describes a technique of inspection of a tyre surface able to safely discriminate different quality rubber pieces incorporated into the tyre surface.

WO 2015/044196 A1 describes a device for the acquisition of images of the inner surface of a tyre comprising illumination means, image acquisition means and a reflector optically interposed between the illumination means and the illuminated area of the tyre surface.

SUMMARY OF THE INVENTION

In the field of tyre quality control, the Applicant has faced the problem of checking the inner and/or outer surface of the tyre by the optical acquisition of digital images thereof and subsequent processing thereof, for example in order to detect the possible presence of defects on, or in the vicinity of, the surface. The defects sought may for example be irregularities on the surface of a tyre (unvulcanised compound, alterations in shape, etc.) structural unevenness, cuts, presence of foreign bodies on the surface, etc.

The Applicant has observed that for the inspection to be used "in line" within a plant for the production of tyres, the inspections itself should be performed in a reduced time, and with reduced costs and/or overall dimensions.

Within this context, the Applicant has perceived that is advantageous to acquire and analyse both two-dimensional images and three-dimensional images of the same surface region. For example, the 3D technology (in particular the one at high-definition, for example with resolution of less than or equal to 10 micron) can be used to detect lacks or excesses of material on the surface of the tyres, typically lack or bubbles, while the 2D technology (in particularly the one at high-definition) can be used to detect defects not visible in 3D, such as thin cuts and spots. Moreover, some features like embossing and knurls are detectable with both technologies.

The Applicant has realized that it is advantageous to simultaneously acquire the 2D and 3D images of the same surface region of tyre.

For this purpose, the 2D and 3D acquisition systems can be advantageously combined in a single device mounted on a robotized arm for its movement in space. The 2D acquisition system can comprise a lighting system and a linear camera having a first optic axis, and the 3D acquisition system, based on the laser triangulation technique, can comprise a laser source adapted to emit a linear laser beam having a propagation direction parallel to the first optic axis and a matrix camera having a second optic axis inclined with respect to the propagation direction. During the rotation of the tyre about its axis, the two acquisition systems can acquire a respective image of the same (entire) circumferential portion of surface of the tyre. In particular, the linear camera can acquire a series of 2D linear images which are then combined into the overall 2D image. The matrix camera can detect a series of 2D matrix images of respective portions of surface on which the laser line is projected. By processing each matrix image (typically on board of the matrix camera itself) the reflected laser line is identified and, using trigonometric algorithms, the elevation of the respective linear portion of surface illuminated by the linear laser beam is calculated. By combining the resulting series of 3D linear images it is given the respective overall 3D image.

The Applicant has realized that, in the present context, wherein the maximum excursion of the height of the tyre surface (that is the maximum difference in height between depressed areas and raised areas) that is to be detected is a few millimetres, it is advantageous to cut ('crop') the 2D matrix image in a neighbourhood of the reflected laser line, before identifying the laser line, or more generally processing only that portion of the 2D image around the reflected laser line. In this way the matrix image processing is carried out only on a sub-portion of the acquired matrix image, requiring less processing time. For example, against an acquired matrix image having a height in the direction perpendicular to the reflected laser line of 1088 pixels, the Applicant has verified that the reflected laser line is typically contained within a band 61 pixels high. It is therefore advantageous to cut the matrix image so as to process only a sub-portion represented by the 61 pixel band (and, for example, as wide as the original image). In this way the checking method of the present invention can be implemented directly in the production line.

Furthermore, the Applicant has realized that it is advantageous to position, during the acquisition, the device in such a way that the first optic axis lies on a radial plane of the tyre. In this way the 2D acquisition system operates in an optimal way, in particular when the lighting system illuminates the surface with grazing light from opposite sides of the objective line.

However, this determines that the propagation plane of the linear laser beam, and therefore also the propagation direction along which the elevation of the surface is detected, typically lies on a non-radial plane. This in turn determines a positioning of the reflected laser line in the acquired matrix image that varies according to the size of the tyre and/or the specific portion of surface to be acquired. For example, the average position of the reflected laser line, with respect to a central line in the acquired matrix image, varies according to the radius of the considered point with respect to the rotation axis, and/or the angle formed between the first optic axis and the plane tangent to the surface of the tyre at the considered point, and/or of the radius of curvature of the portion of surface along the circumferential direction.

In this context, the Applicant has faced the problem of automatically and dynamically selecting (that is, as a function on the tyre size and the specific circumferential portion of surface) the sub-portion of the 2D matrix image that contains the reflected laser line, in order to limit the subsequent processing only to this sub-portion without substantial loss of information.

Finally, the Applicant has found that the aforesaid problem is solved by dynamically calculating the elevation excursion, along the direction of the first optic axis, of a point of the linear portion of surface illuminated by the laser line with respect to the corresponding point of the tyre surface on the first optic axis.

According to an aspect, the invention relates to a method for checking tyres.

Preferably, it is provided predisposing a tyre to be checked having a rotation axis and a surface.

Preferably, it is provided determining a value representative of a shift S along an acquisition direction between an acquisition point on said surface lying on a first radial plane and a position occupied by said acquisition point following a rotation of said tyre about said rotation axis, said position lying on a second (not radial) plane parallel to said first radial plane.

Preferably, it is provided projecting a linear laser beam on a linear portion of surface of said tyre.

Preferably, said linear laser beam propagates on said second plane with a propagation direction that is parallel to said acquisition direction.

Preferably, it is provided acquiring a matrix image of a matrix portion of surface of said tyre containing said linear portion of surface, wherein said matrix image contains a laser line reflected by said linear portion of surface.

Preferably, it is provided determining a sub-portion of said matrix image as a function of said determined value representative of the shift S, wherein said sub-portion of said matrix image contains said reflected laser line.

Preferably, it is provided processing said sub-portion of said matrix image for determining an elevation profile of said linear portion of surface.

The Applicant considers that the aforesaid solution, in particular determining the value representative of the shift S along the acquisition direction between an acquisition point and its position when the tyre is rotated so that the acquisition point lies on the second plane and determining the sub-portion of the acquired matrix image as a function of said value representative of the shift S, allows to determine the sub-portion containing the reflected laser line in an automatic and dynamic way, in view of the variation of the acquisition conditions (e.g. the size of the tyre, the position of the circumferential surface to be acquired, the radius of curvature of the surface along the circumferential direction, the inclination of the acquisition direction with respect to the plane tangent to the surface of the tyre at the point of acquisition). In fact, the shift S, which can be positive or negative, represents the altimetric deviation of the point of the surface illuminated by the laser line with respect to a reference point located on the intersection between the optic axis of the 3D matrix camera and the propagation plane of the linear laser beam (see below).

In this way the processing of the reflected laser line (which typically occurs on board of the matrix camera) takes less time and the check can be carried out within the production line.

The present invention in the aforesaid aspect may furthermore present one or more of the preferred features described below.

Preferably, said value representative of the shift S coincides with said shift S. In other words, it is determined (for example calculated and/or measured) the distance along the acquisition direction between the acquisition point and its rotated position.

Preferably, it is provided providing a first profile of said tyre on said first radial plane, and identifying, on said first profile, a first point representative of said acquisition point. In this way the first profile, for example predetermined for each tyre size, provides a useful starting point for the calculation of the aforesaid value representative of the shift S, for any acquisition point belonging to a respective portion of the surface to be acquired.

Preferably, it is provided determining a second projected profile representative of a perpendicular projection on said first radial plane of a second profile of said tyre on said second plane and identifying, on said second projected profile, a second point representative of a projection of said position on said first radial plane.

Preferably, determining said value representative of the shift S between said acquisition point and said position comprises perpendicularly projecting said second point on said acquiring direction passing through said first point of the first profile, and calculating said value representative of the shift S as a distance between the first point and said second projected point. In this way, it is facilitated, for any acquisition point, the calculation of the aforesaid value representative of the shift S.

Preferably, calculating said second projected profile comprises, for each point of said first profile:

determining a distance R of said each point from the rotation axis, determining a deviation Q from said each point as a function of said distance R and of a distance D between the first radial plane and the second plane;

determining a corresponding point of the second projected profile, said corresponding point being displaced from said each point of the first profile by said deviation Q along a direction perpendicular to the rotation axis and towards the rotation axis.

Preferably, said deviation Q is calculated according to equation $Q=R-\sqrt{(R^2-D^2)}$ and/or according to the equation $Q=R(1-\cos \alpha)$, wherein $\alpha$ is an angle equal to arc sin (D/R).

The aforesaid method allows in a simple and fast way to calculate the second projected profile useful for the calculation of the aforesaid value representative of the shift S for each acquisition point.

Typically said distance D between said first radial plane and said second plane is predetermined. In fact, typically the respective acquisition systems are rigidly coupled to each other.

Typically said distance D between the first radial plane and the second plane is greater than or equal to 50 mm and less than or equal to 200 mm.

Preferably, said sub-portion of matrix image has height along a direction perpendicular to an extension direction of said reflected laser line that is less than one half, more preferably less than one third, of an overall height of the matrix image along said perpendicular direction.

Preferably, said sub-portion of matrix image has width along said extension direction of said reflected laser line equal to an overall width of the matrix image along said extension direction.

Preferably, said height and/or width of the sub-portion of the matrix image is/are predetermined.

Preferably, determining said sub-portion of matrix image comprises determining, as a function of said determined value representative of the shift S, a positioning point in said matrix image with respect to a reference point of said matrix image, said sub-portion being identified with respect to said positioning point.

Preferably, it is provided calculating a distance, in pixels, of said positioning point from said reference point along a dimension perpendicular to an extension direction of said reflected laser line, for conversion into pixels of said representative value of the shift S, as a function of an elevation resolution associated to the pixels of said matrix image.

Preferably, said reference point is a centre of said matrix image.

In this way the method determines the sub-portion to be processed in a simple, fast and reliable way.

Preferably, it is provided acquiring a two-dimensional image of a portion of surface of said tyre comprising said acquisition point along a first optic axis parallel to said acquisition direction and passing through said acquisition point.

Preferably, it is provided illuminating said portion of surface comprising said acquisition point during said acquisition.

Preferably, said portion of surface comprising said acquisition point is a linear portion of surface, more preferably lying on said first radial plane. In this way, both 2D and 3D images of the same circumferential surface region can be acquired in parallel. The acquisition of the 2D image on the first radial plane and with first optic axis on the acquisition point also guarantees optimal conditions from the optic and/or lighting point of view, in particular in the case of the linear portion of surface is illuminated with grazing light alternately from the two sides.

Preferably, said matrix image of matrix portion of surface is acquired along a second optic axis inclined with respect to said first optic axis.

Preferably, an intersection point between said second optic axis and said propagation direction lies in a plane perpendicular to said first optic axis and passing through said acquisition point.

Preferably, said second optic axis is coplanar with said first optic axis and with said propagation direction. In this way the calculation of the elevation profile is rational.

Preferably, it is provided rotating said tyre about said rotation axis and repeating in sequence said operations of projecting the linear laser beam, acquiring a respective matrix image, determining a respective sub-portion of matrix image, processing said sub-portion of matrix image for determining an elevation profile of a series of linear portions of surface. In this way a 3D image of an entire circumferential portion of surface is obtained.

BRIEF DESCRIPTION OF THE DRAWINGS

Further features and advantages will become clearer from the detailed description of some exemplary but not exclusive embodiments of the present invention. This description will be set out below with reference to the accompanying figures, provided for indicative purposes only and, therefore, not for limiting purposes, in which.

DETAILED DESCRIPTION OF SOME EMBODIMENTS OF THE INVENTION

Figure 1:
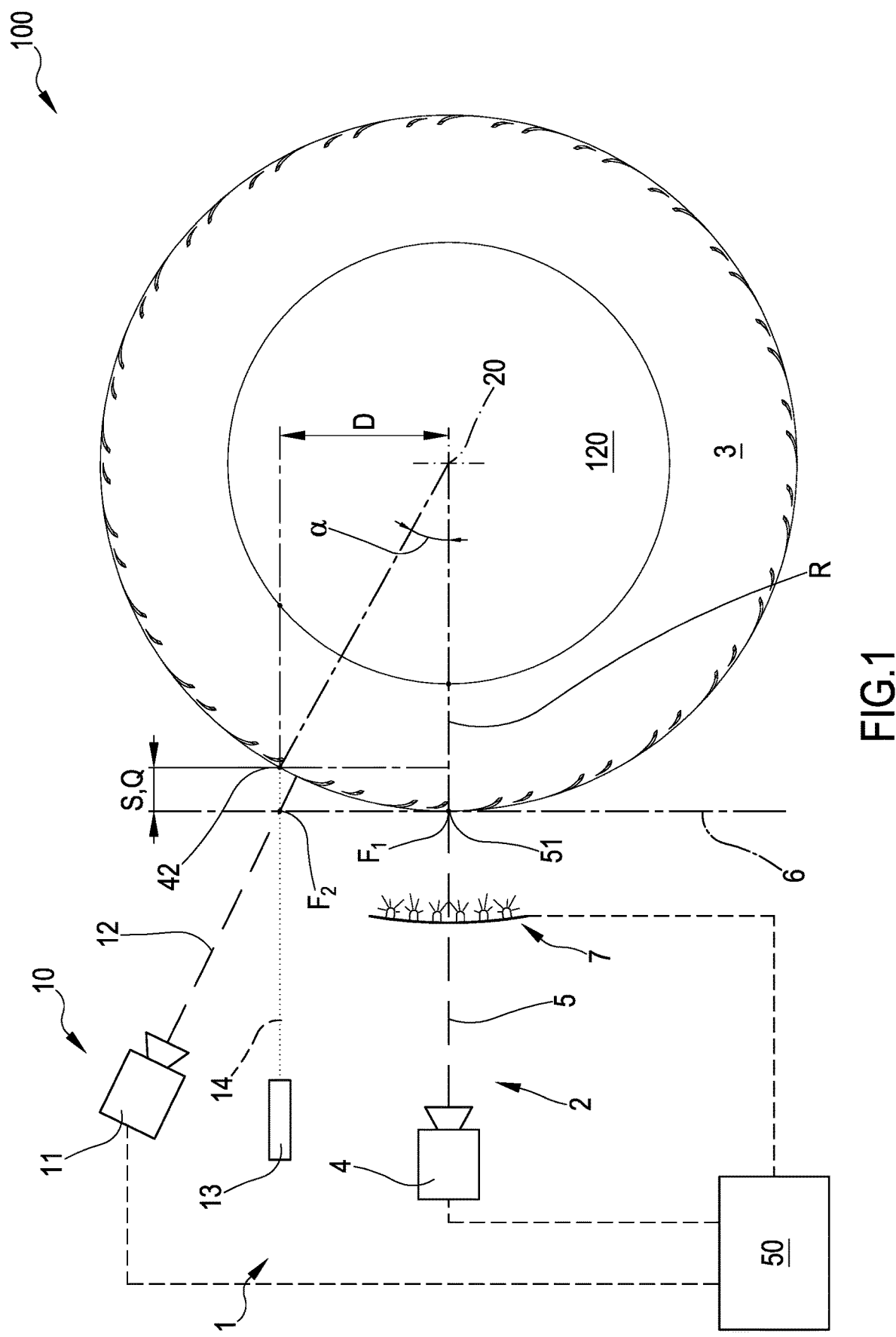
FIG. 1 schematically shows a top view of a system for checking tyres.

Referring to FIG. 1, with reference number 100 it is indicated a system for checking tyres, comprising a device 1 for checking tyres.

Preferably, the device 1 comprises a first acquisition system 2 for acquiring two-dimensional images of the surface of a tyre 3.

The first acquisition system 2 typically comprises a first camera 4 having a first optic axis 5 and a first focal plane 6. For the sake of presentation simplicity, it is assumed that the first optic axis 5 lies in the lying plane of FIG. 1 and that the first focal plane 6 is perpendicular to the lying plane of FIG. 1.

Preferably, the first camera 4 is linear and is characterized by an objective line lying on the intersection between the first focal plane 6 and an optic plane passing through the first optic axis 5 and the linear sensor of the linear camera (exemplary the objective line is perpendicular to the lying plane of FIG. 1). Exemplarily, the objective line is about 100 mm long.

The first acquisition system 2 typically comprises a lighting system 7 adapted to illuminate in a neighbourhood of a first focal point F1 of the first camera, which is located at the intersection between the first optic axis 5 and the first focal plane 6 and belongs to the objective line.

The device 1 comprises a second acquisition system 10 for acquiring three-dimensional images of the surface.

The second acquisition system 10 comprises a second matrix camera 11, having a second optic axis 12, and a laser source 13 able to emit a linear laser beam having a propagation direction 14 and a propagation plane (exemplarily perpendicular to the lying plane of FIG. 1), where the second optic axis 12 is inclined with respect to the propagation plane (for example, the angle formed between the second optic axis 12 and the propagation plane is equal to 15°). In the shown example, the first optic axis 5, the second optic axis 12 and the propagation direction 14 are coplanar.

Preferably, the propagation direction 14 is parallel to the first optic axis 5 and the propagation plane is parallel to the optic plane of the first camera.

Between the propagation plane of the linear laser beam and the optic plane of the first camera a distance D is defined. Exemplarily the distance D is equal to 85 mm.

F2 indicates the intersection between the second optic axis 12 and the propagation plane of the linear laser beam, preferably between the second optic axis 12 and the propagation direction 14. Preferably, the second focal point of the second camera lies in F2. Preferably, the first focal plane 6 passes through the second focal point F2.

Typically, the first and second camera comprise a respective machine body (which houses the sensor and the operating electronics) and a respective objective (which houses the lenses).

Preferably, but not necessarily, the first and second acquisition systems are (rigidly) mounted on a single support frame (not shown) forming part of the device 1, which, in use, is mounted on, and moved in the space by, a movement member (not shown), such as a robotic arm, preferably an anthropomorphic robotic arm with at least five axes.

Preferably, the system 1 comprises a control unit 50 for controlling at least the first and second acquisition systems 2, 10. The control unit 50 can be integrated in a single device or divided into several devices spatially and/or logically separated. For example, the extraction of the reflected laser line can be performed on board of the second camera 11, while the calculation of the second profile (see below) can take place in a remote device.

The system 1 can implement the method for checking tyres of the present invention.

Preferably, it is provided predisposing the tyre 3 to be checked having a rotation axis 20 (perpendicular to the lying plane of FIG. 1). Exemplarily a sidewall of the tyre 3 is supported on a plane (not shown) of horizontal support (for example a fifth wheel) provided with rotating members (not shown) around the rotation axis 20.

Preferably, it is provided providing a first profile of the tyre on a first radial plane.

Figure 2:
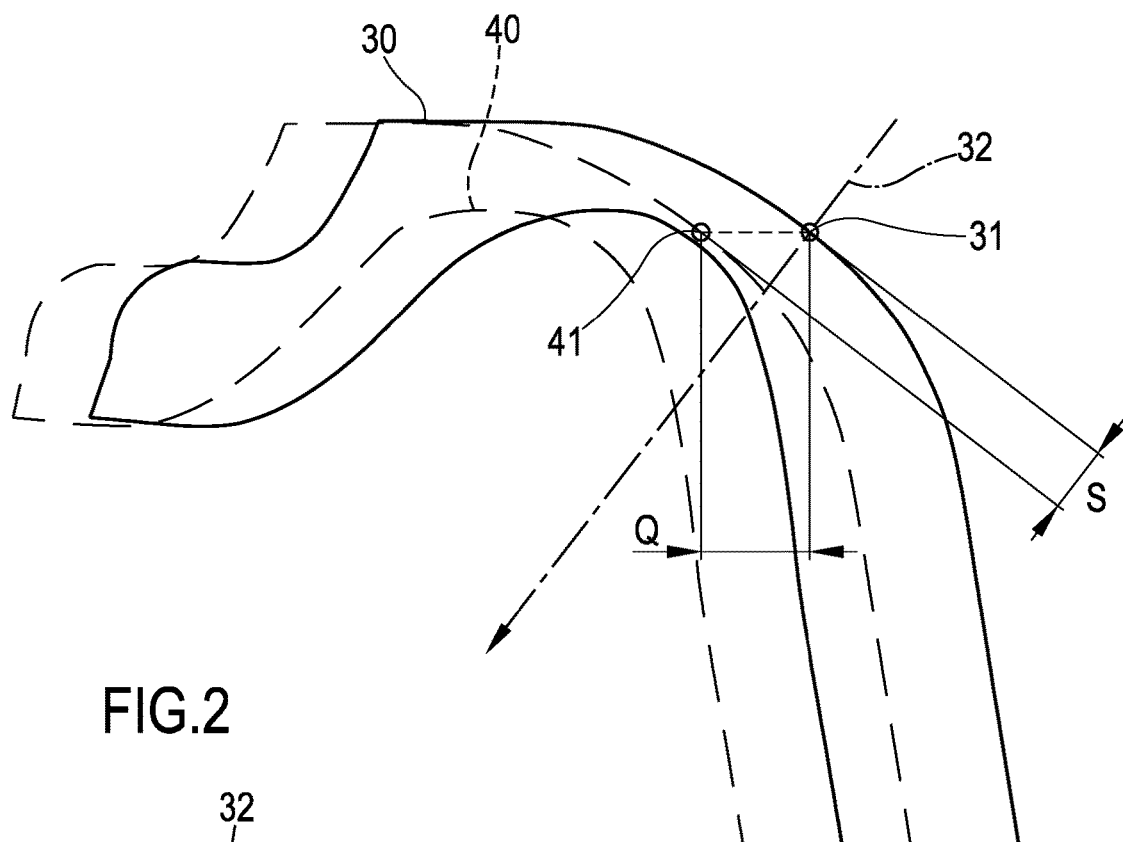
FIGS. 2 and 3 schematically show some steps of the method of the present invention.
Figure 3:
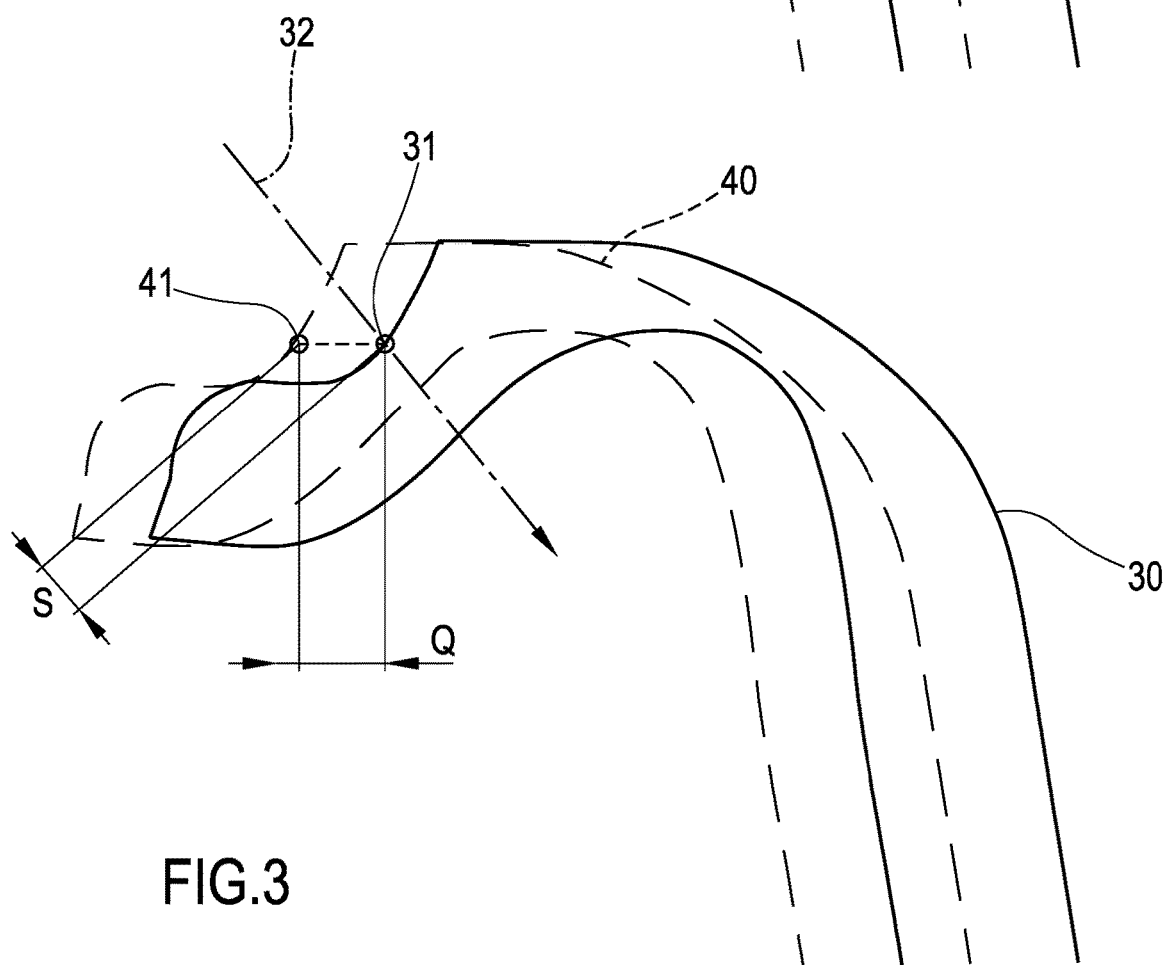

FIGS. 2 and 3 partially show an example of a first profile 30 on any radial plane of the tyre. Preferably, for each tyre size the first profile is predetermined and preloaded in the control unit 50. Alternatively, or in addition, the first profile 30 can be detected in real time directly on the tyre 3, for example by means of a laser scanning system (e.g. at low resolution). Preferably, it is provided individuating a first point 31 on the first profile 30. The first point 31 is representative of an arbitrary acquisition point 51 on the surface of the tyre belonging to the portion of circumferential surface to be acquired (which may be external or internal). In the example of FIG. 2 the first point 31 belongs to the shoulder, while in FIG. 3 the first point 31 belongs to the sidewall. In the example of FIG. 1, the reference number 51 indicates an arbitrary acquisition point on the tread, to which corresponds (not shown) a respective first point on the first profile 30, according to the method of the present invention.

Preferably, it is provided identifying an acquisition direction 32 lying on the first radial plane and passing through the first point 31 of the first profile 30. In this way the orientation of the acquisition direction 32 is determined with respect to the first profile 30. In use the first optic axis 5 is arranged as said acquisition direction 32.

Preferably, it is provided calculating, by the control unit 50, a second projected profile 40 (in dashed line in FIGS. 2 and 3), representative of an orthogonal projection on the first radial plane of a second profile of the tyre on a second plane parallel to the first radial plane and placed at said distance D from the first radial plane. The second plane is therefore non-radial. In use the propagation plane of linear laser beam is arranged as the second plane. Preferably, it is provided individuating, on the second projected profile 40, a second point 41 representative of a projection on the first radial plane of the position 42 occupied by the acquisition point 51 following a rotation of the tyre about the rotation axis which leads the acquisition point 51 on the second plane (see FIG. 1). Therefore, the position 42 has the same distance R from the rotation axis 20 of the acquisition point 51 and lies on a plane perpendicular to the rotation axis and passing through the acquisition point 51.

Preferably, it is provided determining a shift S along the acquisition direction 32 between the first point 31 and the orthogonal projection of the second point 41 on the acquisition direction 32. For example, as exemplarily shown in FIGS. 2 and 3, to determine the shift S the second point 41, previously calculated, is orthogonally projected to the acquisition direction 32 and the shift S is so calculated along the acquisition direction. This shift S represents, in use (FIG. 1), the elevation distance along the propagation direction 14 (which is the direction along which the elevation of the tyre surface is detected) between the position 42 on the surface, when it is illuminated by the linear laser beam, and the point F2 located at the centre of the matrix image acquired by the second camera 11. The position 42 also advantageously lies within the depth of field of the second camera 11 to be sufficiently focused.

Exemplarily, with reference to the direction (indicated by the arrow in FIGS. 2 and 3) along the acquisition direction 32 which, in use, goes from the camera 4 to the tyre, in FIG. 2S is positive (that is, the position 42 is farther away than the point F2 along the propagation direction 14, as shown in FIG. 1), while in FIG. 3S is negative (that is, the position 42 is closer than point F2 along the propagation direction 14, as may occur, for example, during the acquisition of the bead or of the inner surface of the crown portion).

Exemplarily, to calculate the second projected profile 40 the following operations are carried out, for each point 31 of the first profile 30:

determining a distance R of each point 31 from the rotation axis 20;

determining a deviation Q from each point 31 along a direction perpendicular to the rotation axis, the deviation Q being a function of R and of the distance D (in the example of FIG. 1, the deviation Q coincides with the shift S);

determining a corresponding point 41 belonging to the second projected profile 40, the point 41 being displaced from the respective each point of the deviation Q along the direction perpendicular to the rotation axis and towards the rotation axis.

Preferably, the deviation Q is calculated according to the equation $Q=R-\sqrt{(R^2-D^2)}$ or similarly according to the equation $Q=R(1-\cos \alpha)$, wherein $\alpha$ is an angle equal to arc sin (D/R), as shown in FIG. 1.

Preferably, it is provided rotating the tyre about the axis 20.

Preferably, it is provided positioning the device 1 in such a way that the first optic axis 5 passes through an arbitrary acquisition point 51 corresponding to the first point 31 and is oriented as the acquisition direction 32. In this way the first optic axis 5 lies on the first radial plane. It is observed that the first radial plane and the acquisition point 51 refer to any instant during the rotation of the tyre. Exemplarily, the acquisition point 51 lies on the first focal point F1, but more generally it can advantageously lie within the depth of field of the first camera 4 to be sufficiently focused.

Preferably, it is provided, with the rotating tyre, acquiring, with the first acquisition system 2 so positioned, a series of two-dimensional linear images of respectively a series of linear portions of surface of the tyre, each linear portion comprising the respective instantaneous acquisition point 51.

Preferably, it is provided illuminating each linear portion of surface during the acquisition, for example with two types of light in rapid succession: diffused light and grazing light, to obtain respective two-dimensional images.

Preferably, it is provided projecting the linear laser beam with the propagation plane which coincides with the aforesaid second plane (instant by instant).

Preferably, it is provided, with the rotating tyre, acquiring with the second acquisition system 10 (together with the series of two-dimensional linear images), a series of matrix images of respectively a series of matrix portions of surface of the tyre containing the aforesaid series of linear portions of surface, wherein each matrix image contains the respective laser line reflected by the respective linear portion of surface.

Therefore, at each instant, the first acquisition system 2 acquires a two-dimensional image of a linear portion of surface centred at the acquisition point 51, and the second acquisition system 10 acquires a matrix image of a portion of surface containing a corresponding linear portion of surface centred in the position 42 and illuminated by the linear laser beam.

Preferably, it is provided determining a sub-portion of each matrix image as a function of the determined shift S, so that the sub-portion contains the reflected laser line.

Preferably, it is provided processing the sub-portion of the matrix image, typically by trigonometry, for determining an elevation profile of the respective linear portion of surface.

Figure 4:
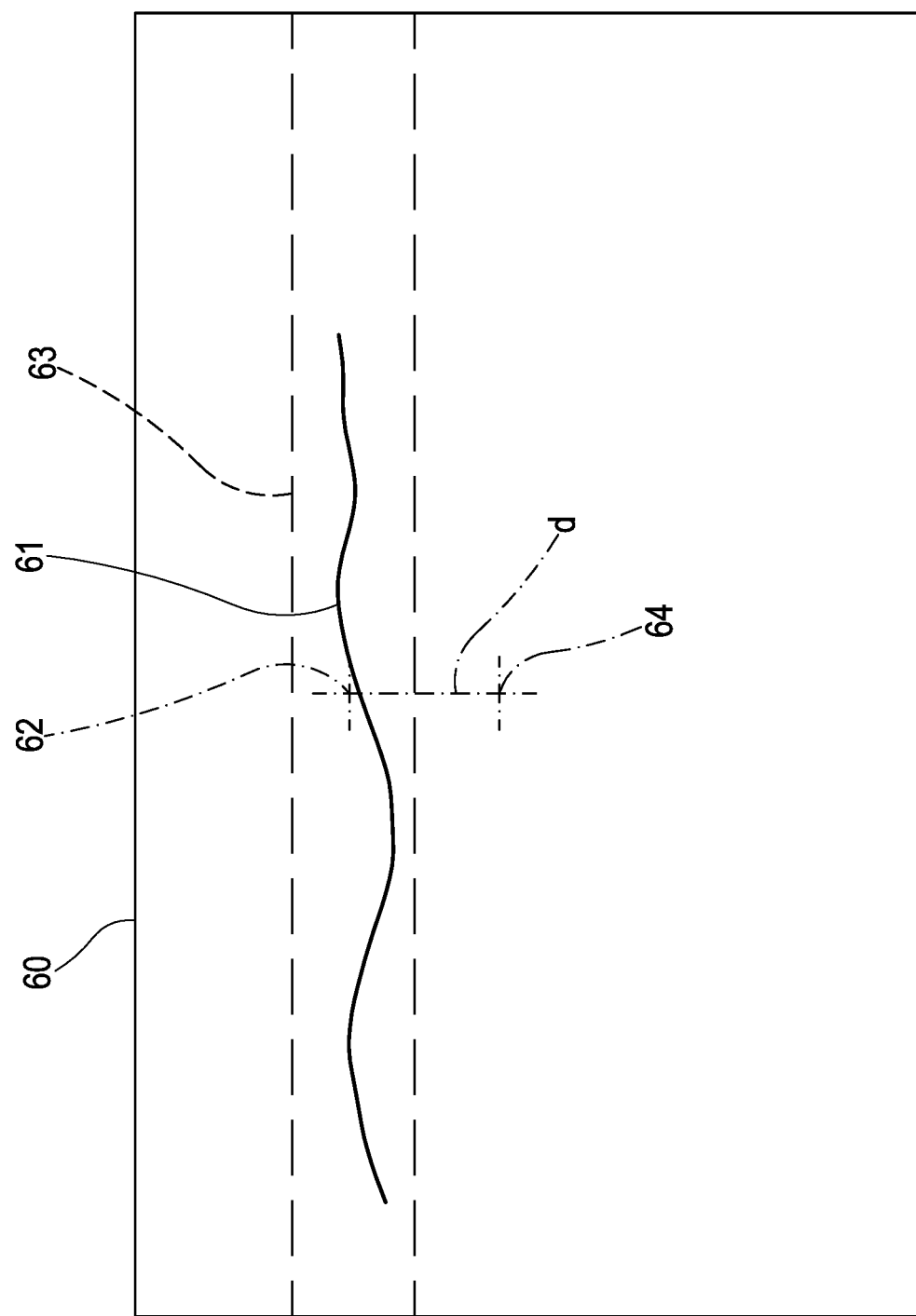
FIG. 4 shows a further step of the method of the present invention.

FIG. 4 shows a merely illustrative example of a matrix image 60 of a portion of surface containing the reflected laser line 61. For example, the image 60, with reference to FIG. 4, is M pixels wide and N pixels high and the sub-portion 63 has predetermined width and height, just for example M×61 pixels. Typically, to each pixel of the image is associated an elevation variation, the centre 64 of the image being the reference point corresponding to the point F2.

Preferably determining the sub-portion of matrix image 60 comprises positioning a centre 62 of an active area 63 of the matrix image at a distance d (in pixels) from a centre 64 of the matrix image, as a function of the determined shift S. The sub-portion will coincide with the active area 63 so positioned. In other words, the active area 63 is a 'mask' that is positioned as a function of the shift S, for example, with reference to FIG. 4, it is moved from the centre 64 of the image.

Preferably, as shown in FIG. 4, determining the sub-portion 63 of matrix image comprises determining, as a function of the determined shift S, a positioning point 62 in the matrix image with respect to the reference point 64 of the matrix image, for example the image centre, the sub-portion being identified with respect to the positioning point 62. For example, it is calculated the distance d, in pixels, of the positioning point 62 from the reference point 64, along the dimension perpendicular to the laser line (in the example along the height of the image 60 as shown), by pixel conversion of the shift S as a function of the elevation resolution associated with each pixel of the matrix image. Exemplarily a pixel of the matrix corresponds (at least locally) to 0.4 mm of height deviation, i.e. the resolution "Rh" in height is 2.5 pixels/mm. Therefore, once the shift S is found, the pixel translation d corresponds to S*Rh. The sub-portion 63 is then identified by assuming the so determined positioning point 62 as the centre of the sub-portion 63.

In an embodiment of the present invention alternative to that described with reference to FIGS. 2 and 3, determining the representative value of the shift S comprises directly measuring the distance between the position 42 on the surface of the tyre, when illuminated by the linear laser beam, and the point F2 which is at the centre of the matrix image acquired by the second camera 11, for example by using the second acquisition system 10.

The invention claimed is:

1. A method for checking tyres, comprising:
predisposing a tyre to be checked having a rotation axis and a surface;
determining a value representative of a shift along an acquisition direction between an acquisition point on said surface lying on a first radial plane and a position occupied by said acquisition point following a rotation of said tyre about said rotation axis, said position lying on a second plane parallel to said first radial plane;
projecting a linear laser beam on a linear portion of surface of said tyre, where said linear laser beam propagates on said second plane with a propagation direction that is parallel to said acquisition direction;
acquiring a matrix image of a matrix portion of surface of said tyre containing said linear portion of surface, where said matrix image contains a laser line reflected by said linear portion of surface;
determining a sub-portion of said matrix image as a function of said determined value representative of the shift, where said sub-portion of said matrix image contains said reflected laser line; and
processing said sub-portion of said matrix image for determining an elevation profile of said linear portion of surface.

2. The method according to claim 1, comprising providing a first profile of said tyre on said first radial plane, and identifying, on said first profile, a first point representative of said acquisition point.

3. The method according to claim 2, comprising determining a second projected profile representative of a perpendicular projection on said first radial plane of a second profile of said tyre on said second plane and identifying, on said second projected profile, a second point representative of a projection of said position on said first radial plane.

4. The method according to claim 3, wherein determining said value representative of the shift between said acquisition point and said position comprises perpendicularly projecting said second point on said acquiring direction passing through said first point of the first profile, and calculating said value representative of the shift as a distance between the first point and said second projected point.

5. The method according to claim 4, wherein calculating said second projected profile comprises, for each point of said first profile:
determining a distance R of said each point from the rotation axis,
determining a deviation Q from said each point as a function of said distance R and of a distance D between the first radial plane and the second plane; and
determining a corresponding point of the second projected profile, said corresponding point being displaced from said each point of the first profile by said deviation Q along a direction perpendicular to the rotation axis and towards the rotation axis.

6. The method according to claim 5, wherein said deviation Q is calculated according to equation $Q=R-\sqrt{(R^2-D^2)}$ and/or according to the equation $Q=R(-\cos\alpha)$, wherein $\alpha$ is an angle equal to $\arcsin(D/R)$.

7. The method according to claim 6, wherein said distance D is predetermined, and wherein said distance D is greater than or equal to 50 mm and less than or equal to 200 mm.

8. The method according to claim 7, wherein said sub-portion of matrix image has a height along a direction perpendicular to an extension direction of said reflected laser line that is smaller than an overall height of the matrix image along said perpendicular direction.

9. The method according to claim 8, wherein determining said sub-portion of matrix image comprises determining, as a function of said determined value representative of the shift, a positioning point in said matrix image with respect to a reference point of said matrix image, said sub-portion being identified with respect to said positioning point.

10. The method according to claim 9, comprising calculating a distance, in pixels, of said positioning point from said reference point along a dimension perpendicular to an extension direction of said reflected laser line, for conversion into pixels of said representative value of the shift, as a function of an elevation resolution associated to the pixels of said matrix image.

11. The method according to claim 10, comprising acquiring a two-dimensional image of a portion of surface of said tyre comprising said acquisition point along a first optic axis parallel to said acquisition direction and passing through said acquisition point.

12. The method according to claim 11, where said portion of surface comprising said acquisition point is a linear portion of surface lying on said first radial plane.

13. The method according to claim 12, wherein said matrix image of matrix portion of surface is acquired along a second optic axis inclined with respect to said first optic axis.

14. The method according to claim 13, comprising rotating said tyre about said rotation axis and repeating in sequence said operations of projecting the linear laser beam, acquiring a respective matrix image, determining a respective sub-portion of matrix image, and processing said sub-portion of matrix image for determining an elevation profile of a series of linear portions of surface.

15. The method according to claim 14, wherein said value representative of the shift coincides with said shift.

* * * * *